Sept. 23, 1969 V. H. MAYS ET AL 3,468,180

SHIFTING MECHANISM FOR TRANSMISSION

Filed Oct. 25, 1967 2 Sheets-Sheet 1

INVENTORS
VANCE H. MAYS.
JAMES H. LEMKE.
BY
WILSON, SETTLE & BATCHELDER.
ATT'YS.

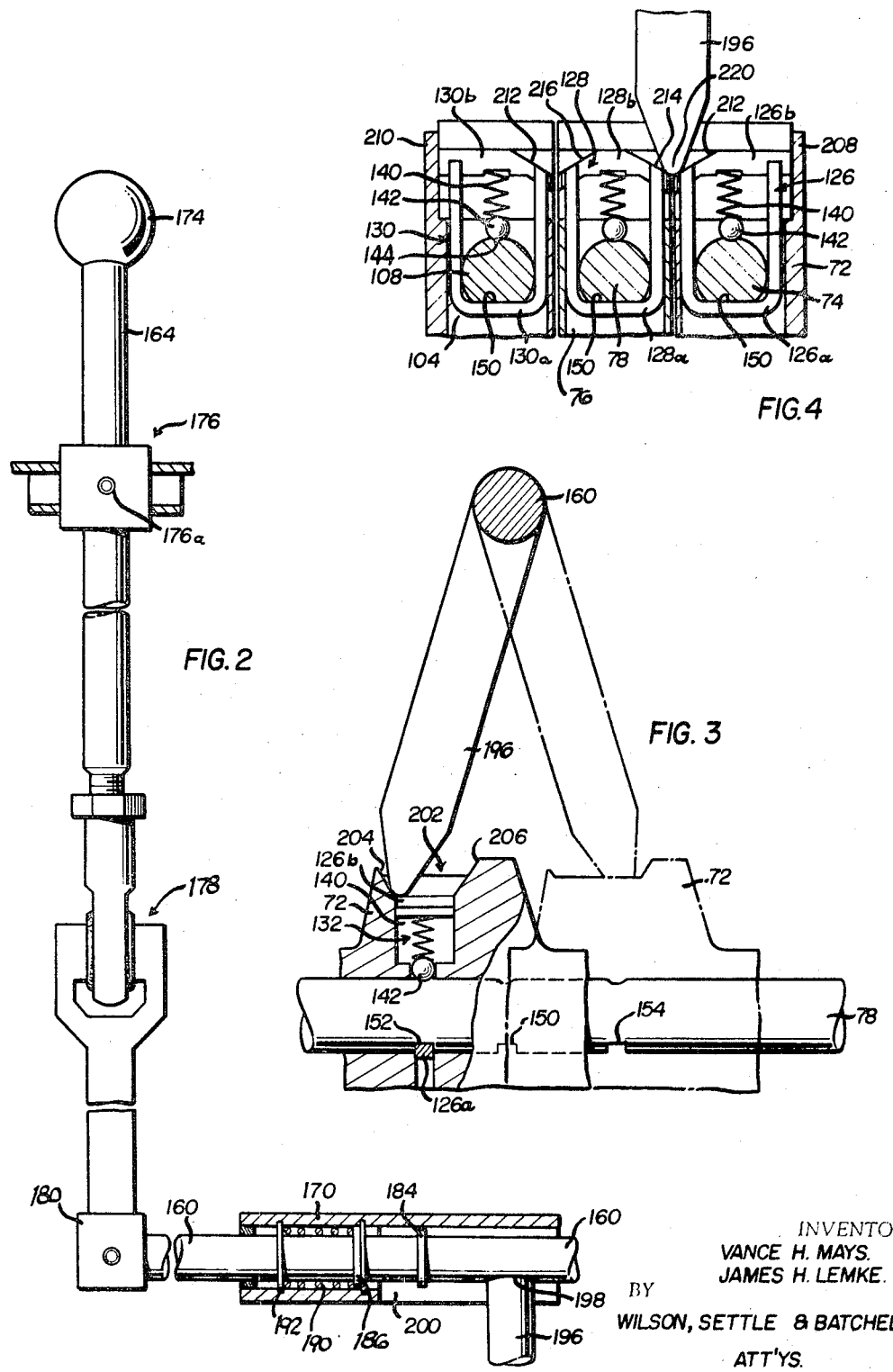

United States Patent Office 3,468,180
Patented Sept. 23, 1969

3,468,180
SHIFTING MECHANISM FOR TRANSMISSION
Vance H. Mays, Racine, and James H. Lemke, Sturtevant, Wis., assignors to J. I. Case Company, Racine, Wis., a corporation of Wisconsin
Filed Oct. 25, 1967, Ser. No. 678,007
Int. Cl. G05g 9/00, 13/00
U.S. Cl. 74—475          5 Claims

ABSTRACT OF THE DISCLOSURE

A transmission including gear shifter forks which are operated by rotatable and axially movable control mechanism. A pair of the mechanism selectively engages a fork and a locking device carried thereby to release the locking device and to shift the fork with ease without disturbing other forks and their locking devices.

BACKGROUND OF THE INVENTION

The present invention relates generally to transmissions and more particularly to an improved shifting mechanism for a sliding gear transmission.

It has been previously proposed to provide shifting mechanisms for a sliding gear transmission with locking features wherein the locking arrangement in many instances did not provide an interlock feature which was effective and at the same time permit ease of shifting.

The most common method of locking the mechanism in the prior art transmissions was to utilize some type of spring providing a direct spring force to counteract the forces tending to disengage the gears. However, in the past this has necessitated heavy springs which could provide sufficient forces to maintain the gears in engagement and many times the springs would still yield to the disengaging forces.

SUMMARY OF THE INVENTION

A shifting mechanism for a sliding gear transmission includes a shifting control shaft which is arranged to be rotated and/or moved axially in opposite directions and carries a shifting shaft or selecting bar which moves with the control shaft for selectively engaging locking clips on respective shifter forks. The selector bar releases the associated locking clip on a fork conditioning the selected fork for movement from one position to another without affecting the locking clips of other shifting forks. The locking clips are each controlled by a compression spring which offers little resistance to the shifting and at the same time provide a positive lock for the engaged position of each gear and interlock between the forks.

The primary object of the present invention is to provide a simple locking arrangement for a shifting fork which requires a minimum amount of spring force to maintain the fork in engaged position.

Another object is to provide a new and improved shifting arrangement for transmissions wherein locking mechanisms provide an interlock between shifter elements and are effective and releasable upon conditioning for selective shifting while offering little resistance to shifting from one position to another.

Other objects of this invention will appear in the following description and appended claims, reference being had to the accompanying drawings forming a part of this specification wherein like reference characters designate corresponding parts in the several views.

In the drawings:

FIGURE 2 is a fragmentary view in elevation of the gear shift mechanism carried by the device shown in FIGURE 1;

FIGURE 3 is a fragmentary view of a portion of the shifting mechanism showing portions of such shifting mechanism in different engagement positions; and FIGURE 4 is a sectional view taken in the direction of the arrows along line 4—4 of FIGURE 1.

Figure 1:
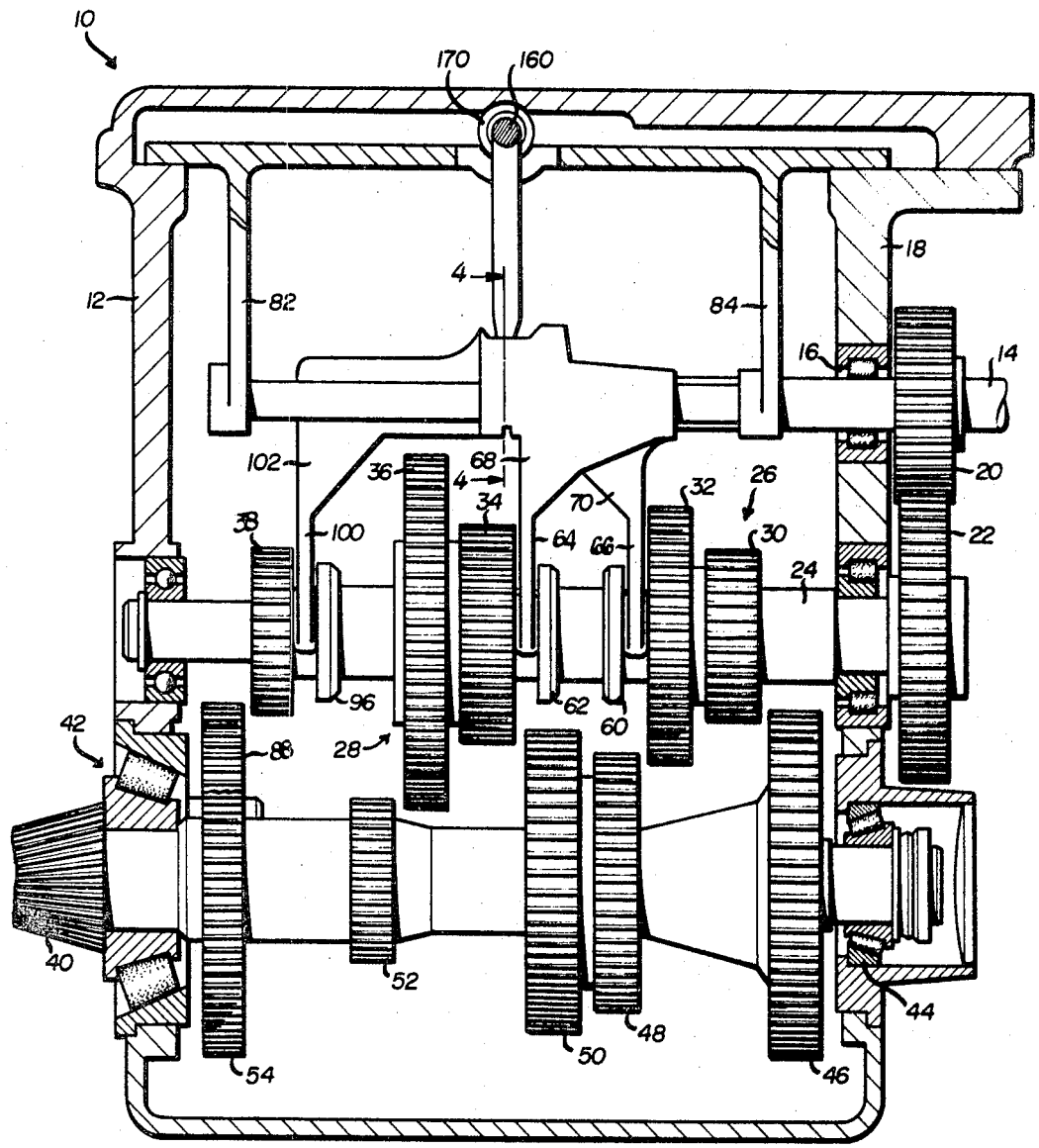
FIGURE 1 shows a fragmentary side view in cross section of a sliding gear transmission having the shifting mechanism embodying features of the invention.

Before explaining the present invention in detail, it is to be understood that the invention is not limited in its application to the details of construction and arrangement of parts illustrated in the accompanying drawings, since the invention is capable of other embodiments and of being practiced or carried out in various ways.

Referring to the drawings the numeral 10 designates in general a transimssion embodying features of the invention. The transmission 10 includes a housing 12, and an input shaft 14 rotatably journalled in a bearing 16 fixed in an opening of a vertically extending plate 18 forming part of housing 12.

The input shaft 14 is rotated by a vehicle power source (not shown) which is transmitted through a gear 20 fixed or keyed to the shaft 14 that is in constant mesh with a second gear 22 carried by a countershaft 24. The countershaft 24 slidably receives first and second gear sets 26 and 28 including gears 30, 32, 34 and 36 and which are of various size to produce different gear ratios between the input shaft 14 and an output shaft 40. The countershaft also has a single gear 38, for a purpose to become apparent hereinafter.

The output shaft 40 is journaled in spaced bearings 42 and 44 mounted at spaced points in the housing 12 with gears 46, 48, 50, 52 and 54 fixed for rotation therewith. The gears 30 through 38 are adapted to be moved along countershaft 24 to provide for selective engagement of the respective gears with the associated gears 46 through 54. For this purpose, each of the gear sets 26, 28 include grooved collars 60 and 62 which receive yoke portions 64 and 66 of shifted forks 68 and 70. The hub 72 of shifter fork 68 is slidably supported on a shaft 74 while the hub 76 of the shifter fork 70 is slidably supported on a second shaft 78. The opposite ends of the shafts 74 and 78 are secured to flanges 82 and 84 depending from the upper part of the housing 12.

As stated above, the separate gear 38 is also slidably mounted on shaft 24 for engagement with an idler gear 88 which engages gear 54 fixed on shaft 40. For this purpose, the gear 38 includes a grooved collar 96 which receives a yoke portion 100 of a shifter fork 102. The hub 104 of shifter fork 102 is slidably supported on a shaft 108, the opposite ends of which are secured to the flanges 82 and 84. The shafts 74, 78 and 108 are arranged in parallel relationship with each other on the same horizontal plane and the forks 68, 70 and 102 slidable thereon are basically the same with the fork 102 being longer to engage gear 88. According to the invention, the forks 68, 70 and 102 include locking means having detent locking clips 126, 128 and 130, respectively. The clips, respectively include a U-shaped portion 126a, 128a and 130a surrounding the respective shafts and base portions 126b, 128b and 130b interconnecting the legs of the U-shaped portions. The base portions of each clip are respectively guided in slots 132 formed in the hubs of the respective forks. A helical compression spring 140 is interposed between the base of each clip and a ball detent 142 which engages a detent notch or slot 144 in a respective shaft when in neutral position. The shafts 74, 78 and 108 each have a notch 150 at a neutral position and notches 152 and 154 at each engagement position for respectively receiving the U-shaped portions 126a, 128a and 130a to lock the respective shifter forks in a desired position.

Thus, the detent locking clips which encircle the shafts 74, 78 and 108, are retained in one of the selected shaft notches 150, 152 or 154 by the action of the springs 140. The springs 140 are positioned to hold the detents and require very little effectiveness to so hold the detents and the result follows that the detents are easily released from the notches as very little pressure is required to compress the springs. Also, the arrangement of the clips and the associated notches insure positive locking of the respective gears in the engaged position with only a small spring force required to maintain the gears in locked position.

In order to operate the shifter forks and the locking means carried thereby a shifting control means is provided for that purpose. In the present invention, the control means includes a rotatable and axially movable shaft 160 which is operated by a gear shift lever 164. The shaft 160 is journaled in a tubular portion or upper part 170 of the housing 12. The lever 164 includes a knob 174 which may be rotated in planes perpendicular to each other with respect to the double axis pivot 176 and the respective movements of the lever 164 are transmitted through flexible joint 178 and connection 180 to slide shaft 160 axially in both directions or rotate that shaft within housing 170.

The shaft 160 carries a snap ring 184, a washer 186 and a preload spring 190, which has one end in engagement with a fixed ring 192 carried by the upper part 170 of housing 12, for a purpose to be described later. The shaft 160 also carries a shifting shaft or selector bar 196 which is screw threaded into shaft 160 at 198. Thus, the selector bar or finger 196 rotates with shaft 160 and moves in opposite directions in a slot 200 as the shaft moves axially in the housing upper part 170. The selector bar or finger 196 is guided throughout its entire movement in any direction by coaction between the respective fork hubs and the base portions of the locking means. For this purpose, the hubs 72, 76 and 108 are respectively provided with recesses 202 (FIGURE 3) in the upper ends thereof each of which terminates at inclined walls 204 and 206 at opposite sides. One of the ends of the walls 204 and 206 on hub 72 are interconnected by a vertical wall 208 (FIGURE 4) while the opposite ends of walls 204 and 206 on hub 108 are interconnected by a vertical wall 210, for a purpose to be described later.

The base portions 126b and 130b of the clips 126 and 130 each have a single inclined camming surface 212 while the base portion of clip 128 has two inclined camming surfaces 214 and 216.

FIGURES 1 and 4 show all of the forks and the associated locking means in neutral position while FIGURE 3 shows the fork 68 in two engagement positions. From FIGURES 1 and 3 it will be noted that the shifting shaft or selector bar 196 is in engagement with one of the bases of the locking clips. Referring to FIGURE 4 it will be noted that upon axial movement of shaft 160, the shaft or bar 196 will be moved to engage a selected shifter fork. It will be noted that the shifter forks 68, 70 and 102 are in parallel alignment on the same horizontal plane which permits the selecting bar 196 to move from one shifter fork to another to select a fork for movement in the desired direction and to move the gears for the proper gear ratio.

Referring to FIGURE 4 it will be seen that the selecting bar is one of the two neutral positions between adjacent forks and locking means, from which it may be moved to engage any selected shifter fork and detent locking means.

The operation of the mechanism is as follows: In order to condition the transmission for operation, the gear shift 164 is rotated axially of pin 176a to move the shifting shaft 160 axially and have the end of the finger 196 depress one of the locking means 126, 128 or 130. If, for example, the finger 196 is moved rightward, as viewed in FIGURE 4, the tip 220 thereof will slide along camming surface 212 to compress the spring 140 and move portion 126a out of slot 150. The amount of movement in this direction is limited by the vertical wall 208.

Thus, when the tip 220 of finger 196 is directly above shaft 74 the locking clip 126 is depressed sufficiently to allow the fork 68 to be moved axially of shaft 74. This is accomplished by rotating the shifting shaft 160 to move the finger or selector bar from the position shown in FIGURE 1 to either of the positions shown in FIGURE 3. Thus, if the selector bar is rotated clockwise, as viewed in these figures, the fork 68 will be moved towards the left to engage gear 36 with gear 52. During this movement, the selector shaft 196 will be in engagement with inclined wall 204 of slot 202 and the fork will be moved from the position shown in FIGURE 1 to the solid line position shown in FIGURE 3. Of course, the tip 220 will move along a rising and falling arc, as viewed in FIGURE 3, and the locking clip 126a, will be received in the notch 152 to lock the fork in a position corresponding to the engaged position of the gear 36.

The movement of the selector bar along the forks 68, 70 and 102 can be determined by the operator by the following action. Thus, when the shifting shaft or selector bar 196 is directly above fork 68 it will be felt by the operator when it meets and stops on retaining wall 208. When the bar 196 is directly over fork 70 it will be felt by the operator when the snap ring 184 meets washer 186 which is held in place by preloaded spring 190 on the shaft 160. In order to shift above fork 102, it is necessary for the operator to overcome spring 190 which the operator will know when the spring force becomes excessive or bar 196 meets and stops on retaining wall 210. Movement of shaft 196 directly above any fork depresses the detent locking means out of locking notch on its respective shaft to free the fork on its shaft.

Movement of the bar 196 in the opposite direction from neutral will move the fork 68 in the opposite direction to the dotted line position of FIGURE 3 in which the gear 34 is in mesh with gear 50.

Counterclockwise rotation of shaft 196 from the solid line position of FIGURE 3 again moves the tip 220 thereof in a rising and falling arc. The first few degrees of rotation, approximately 4°, in shifting the selected shifting fork out of gear are used to depress the detent locking clip sufficiently to move the clip portion or detent out of the locking notch 152. When the tip 220 of shaft 196 meets the inclined wall 206, of the fork the detent is out of the locking notch and the movement of the fork proceeds.

In order to shift into first gear the fork 70 is moved rightward as viewed in FIGURE 1, to shift gear 30 into mesh with gear 46. To shift into second gear the fork 68 is moved rightward to shift gear 34 into mesh with gear 50. To shift into third gear the fork 70 is moved in the opposite direction to move gear 32 into mesh with gear 48 and to shift into fourth gear the fork 68 is moved in the opposite direction to move gear 36 into mesh with gear 52. These gears are forward gears. In order to reverse the direction of movement of the vehicle where the forward gears and their shifter forks are in neutral, the shifter fork 102 shifts reverse gear 38 into mesh with idler gear 88 which is in continuous mesh with a reverse gear 90. When a sliding gear has moved to engagement position the point 220 of bar 196 has risen high enough to allow the detent locking clip to be moved to its maximum height and snaps into a locking notch by the action of a spring 140. In view of the fact that the spings are used to move the detent locking clip the springs need not be very effective as little force is required to move these clips. Thus, the shifting process is simple and easy as the springs offer little resistance and are utilized to aid in simplified locking devices. Because of this arrangement of shifting and locking it is now impossible for forces of the gear to push the fork out of gear without shearing the detent locking clip and the other forks are locked into neutral position with these detent locking clips. Since shaft or bar 196 can only be in one position at a time there is a built-in interlock.

Although the invention has been shown in connection with three shifting forks, it will be readily apparent the shifting mechanism is equally applicable to a transmission requiring two or only on shifting forks.

While one exemplary embodiment of the invention has been described in detail, it will be apparent to those skilled in the art that the disclosed embodiment may be modified.

I claim:

1. A shifting mechanism for a sliding gear transmission comprising at least one shifter element slidable on a rail and having locking means to lock said element on said rail in selected positions, actuating means rotatable and selectively movable in opposite directions and having a member engageable with said at least one shifter element for releasing said locking means and moving said shifter element in selected directions between neutral and engaged positions, the improvement of said locking means comprising clip means encircling said rail, guide means on said element slidably receiving said clip means for guiding said clip means between a first locking position and a second release position, biasing means normally maintaining said clip means in said first position and recess means on said rail for receiving a portion of said clip means and defining the neutral and engaged positions of said element whereby movement of said actuating means releases said locking means and moves said element between said positions.

2. A shifting mechanism as defined in claim 1, further including a like second movable shifter element disposed in spaced parallel relationship with the first movable shifter element and having locking means, and said actuating means being movable and rotatable for engagement with a selected shifter element to release the associated locking means and to move shifting element between neutral and engaged positions.

3. A shifting mechanism as defined in claim 2 in which said actuating means includes a shaft and a selecting bar movable upon axial and rotational movement of said shaft and the shifter elements include aligned slots for receiving said selecting bar upon axial movement thereof to select a shifter element and for engagement with said shifter elements to move said elements between neutral and engagement positions upon rotation of said shaft.

4. A shifting mechanism as defined in claim 1, including the further improvement of cam means on a surface of said clip means and engageable by said actuating means to move said clip means from the first to the second position.

5. A shifting mechanism for a transmission and including a plurality of shifter forks, each fork slidable on a separate shifting rail and movable in opposite directions from a neutral position, a rotatable and axially movable shifting shaft spaced from said rails for moving said shifter forks, and locking means interposed between each said rail and said shifter fork and normally locking the fork on the associated rail in a neutral position, the improvement of each rail locking means comprising an element guided on the shifter fork and movable between locking and release positions, said element encircling the associated rail and normally biased to said locking position by biasing means engaging said rail element, means defining a slot on each said forks with portions of said elements extending into said slots, said slots defining a continuous slot when said forks are in the neutral position, a finger extending from said shaft and received in said continuous slot whereby axial movement of said shaft will cause said finger to selectively move said elements from locking to release positions and rotation of said shaft will cause shifting of the associated released fork from the neutral to engaged position.

References Cited

UNITED STATES PATENTS

| | | | |
|---|---|---|---|
| 2,242,027 | 5/1941 | Fishburn | 74—475 |
| 2,402,842 | 6/1946 | Rhodes | 74—475 |
| 2,748,910 | 6/1956 | Klecker | 74—477 X |

MILTON KAUFMAN, Primary Examiner